United States Patent
Xu et al.

(10) Patent No.: US 9,727,536 B2
(45) Date of Patent: Aug. 8, 2017

(54) LOGIC PROCESSING APPARATUS AND LOGIC PROCESSING METHOD FOR COMPOSITE GRAPHS IN FIXED LAYOUT DOCUMENT

(71) Applicants: PEKING UNIVERSITY FOUNDER GROUP CO., LTD., Beijing (CN); FOUNDER APABI TECHNOLOGY LIMITED, Beijing (CN); PEKING UNIVERSITY, Beijing (CN)

(72) Inventors: Canhui Xu, Beijing (CN); Zhi Tang, Beijing (CN); Xin Tao, Beijing (CN); Cao Shi, Beijing (CN)

(73) Assignees: Peking University Founder Group Co., Ltd., Beijing (CN); Founder APABI Technology Limited, Beijing (CN); Peking University, Beijing (CN)

( * ) Notice: Subject to any disclaimer, the term of this patent is extended or adjusted under 35 U.S.C. 154(b) by 710 days.

(21) Appl. No.: 14/104,245

(22) Filed: Dec. 12, 2013

(65) Prior Publication Data
US 2014/0337717 A1 Nov. 13, 2014

(30) Foreign Application Priority Data
May 10, 2013 (CN) .......................... 2013 1 0172879

(51) Int. Cl.
*G06F 17/00* (2006.01)
*G06F 17/21* (2006.01)
*G06F 3/0484* (2013.01)
*G06F 17/27* (2006.01)

(52) U.S. Cl.
CPC .......... *G06F 17/212* (2013.01); *G06F 3/0484* (2013.01); *G06F 17/2705* (2013.01)

(58) Field of Classification Search
CPC ...................................................... G06F 17/21
See application file for complete search history.

(56) References Cited

U.S. PATENT DOCUMENTS

| | | | | |
|---|---|---|---|---|
| 8,443,278 B2 * | 5/2013 | Mansfield | ............. | G06F 17/211 715/227 |
| 9,015,153 B1 * | 4/2015 | Zhang | ................... | G06F 17/28 707/723 |
| 2008/0270334 A1 * | 10/2008 | Ma | ........................ | G06Q 10/10 706/20 |
| 2010/0174982 A1 * | 7/2010 | Mansfield | ............. | G06F 17/211 715/243 |
| 2010/0284623 A1 * | 11/2010 | Chen | .................. | G06K 9/00463 382/224 |

(Continued)

*Primary Examiner* — Mustafa Amin
(74) *Attorney, Agent, or Firm* — Brinks Gilson & Lione (57) ABSTRACT

A logic process apparatus for composite graphs in a fixed layout document is provided in this invention. The apparatus includes a composite graph block extraction unit, for extracting composite graph blocks from the fixed layout document, a document parsing unit, for parsing the fixed layout document to obtain text primitives contained therein, a legend primitive extraction unit, for extracting legend primitives from the text primitives, a correlation detection unit, for detecting correlations between the composite graph blocks and the legend primitives, and a correlation storage unit, for storing the detected correlations. A logic process method for composite graphs in a fixed layout document is also provided.

6 Claims, 6 Drawing Sheets

(56) References Cited

U.S. PATENT DOCUMENTS

| | | | |
|---|---|---|---|
| 2011/0064301 A1* | 3/2011 | Sun ........................ | G06K 9/468 |
| | | | 382/159 |
| 2013/0205202 A1* | 8/2013 | Xiao ................... | G06F 17/2264 |
| | | | 715/249 |
| 2015/0161086 A1* | 6/2015 | Wu .................... | G06F 17/30247 |
| | | | 715/234 |

* cited by examiner

LOGIC PROCESSING APPARATUS AND LOGIC PROCESSING METHOD FOR COMPOSITE GRAPHS IN FIXED LAYOUT DOCUMENT

CROSS-REFERENCE TO RELATED APPLICATIONS

This application claims priority to Chinese Patent Application No. 201310172879.3, filed on May 10, 2013 and entitled "LOGIC PROCESSING APPARATUS AND LOGIC PROCESSING METHOD FOR COMPOSITE GRAPHS IN FIXED LAYOUT DOCUMENT", which is incorporated herein by reference in its entirety.

FIELD OF THE INVENTION

The present invention relates to the field of electronic document format conversion techniques, and more particular, to a logic processing apparatus for composite graphs in a fixed layout document and a logic processing method for composite graphs in a fixed layout document.

DESCRIPTION OF THE RELATED ART

According to the generation process of fixed layout documents, a document is the collection of data and structures, particularly, including content data, a physical structure and a logic structure. Content data refers to data contained in a document, such as text, images, graphs, etc. The physical structure represents content data's layouts and combinations in the page, including text lines, text blocks, graphs, etc. The logic structure represents information reflected by the content data and relationships therebetween, including not only logic properties of page elements, such as text paragraphs, the abstract, titles, forms, etc, but also the document's hierarchy and logical correlations between document elements, such as correlations between figures and legends.

Document analysis extracts the physical structure of a document, and document understanding establishes mapping relationships between the physical structure and the logic structure. For a document analysis task, its available input is the final morphology of the document, without physical and logic information represented explicitly. A logic model and a physical model used when generating the document must be inferred reversely to restore the physical and logic structures of the document to the greatest extent. In practical applications, readability requirements of mobile devices make physical and logic structure recovery more important.

In physical and logic structure recovery, a document's logic structure information may be extracted from its page level, to notate physical structure blocks extracted from a page according their logic functions. Currently, page logic structure analysis based on traditional image documents benefited from developments in the AI field. Logic structure analysis has evolved from methods based on prior rules to methods based on machine learning. Different to the method of traditional image documents, fixed layout documents may provide information that may assist layout understanding. However, a fixed layout document may have many joint primitives and superimposed layers present therein. Such data cannot be used directly to constitute the document's logic structure, and contents which they represent may be determined only after joint and superimposing operations based on spatial relationships. Classification, identification and notation of non-text objects in pages are focuses of document understanding, wherein the analysis and understanding of composite graphs in text-graph mixing pages are both facing some challenges.

Thereby, a new logic process technique for composite graphs in a fixed layout document is desirable, which may process composite graphs partitioned from the fixed layout document appropriately to facilitate layout understanding of composite graphs in text-graph mixing pages of a fixed layout document, and avoid logic mistakes.

SUMMARY OF THE INVENTION

In view of the above problems, a new logic process technique for composite graphs in a fixed layout document is provided, which may appropriately perform a logic process on composite graphs partitioned from a fixed layout document to facilitate layout understanding of composite graphs on graph-text mixing pages of a fixed layout document, and avoid logic mistakes.

Thus, a logic process apparatus for composite graphs in a fixed layout document is provided, comprising: a composite graph block extraction unit, for extracting composite graph blocks from the fixed layout document; a document parsing unit, for parsing the fixed layout document to obtain text primitives contained therein; a legend primitive extraction unit, for extracting legend primitives from the text primitives; a correlation detection unit, for detecting correlations between the composite graph blocks and the legend primitives; and a correlation storage unit, for storing the detected correlations.

In this technical solution, a composite graph block comprises a graph and text within or around the graph. Composite graph block extraction is a process for separating the graph and its corresponding text as a whole from the main body of a fixed layout document, to enable proper typesetting of composite graphs in the flow rearrangement of the fixed layout document. For the reason of document typesetting, a graph may be separated from its legend (for example, under the graph, including the title of the graph and a piece of text describing the graph) by a larger space. For the purpose of precise composite graph block extraction, graphs are liable to be separated from their legends, wherein graphs are partitioned into composite graph blocks while their legends are remained in other segments of the fixed layout document. Although partition is realized in the physical structure, some issues may arise in the logical structure. Thus, through establishing correlations between composite graph blocks and their legend primitives in this solution, composite graph blocks may be correlated with their legend primitives in the logic structure, enabling a more accurate and reasonable partition process of composite graphs in a fixed layout document.

The above technical solution, preferably further comprises: an information acquisition unit, for acquiring feature property information of the composite graph blocks; an element classification unit, for according to the feature property information, classifying elements contained in the composite graph blocks; a composite graph processing unit, for according to the classification result, preserving text illustration composite graphs of the composite graph blocks and filtering other elements for the detection of correlations between the text illustration composite graphs and the legend primitives performed by the correlation detection unit.

In this technical solution, the composite graph blocks comprise text illustration composite graphs and other elements, such as graphic trademarks, formulas, column bars, page heads, page footers, decorated composite graphs. These elements may have impacts on scopes corresponding to actual text illustration composite graphs when composite graphs are delimited. For instance, a scope corresponding to a text illustration composite graph is delimited by its minimal enclosing rectangle. Without the filtering process of other elements, a rectangle box larger than its actual scope may be determined, as a result, contents that are not legend primitives may be considered as legend primitives by mistake, causing logic mistakes accordingly.

The above technical solution, preferably, further comprises: a labelling unit, for adding a corresponding logic label for each element of the composite graph blocks to specify its category; and the correlation storage unit is further used to: store the logic labels and/or identifiers of primitives corresponding to the logic labels.

In this technical solution, through adding a logic label for each element, logic relationships corresponding to various elements may be examined and managed readily, so that better display effects may be achieved after the flow conversion of a fixed layout document.

In the above technical solution, preferably, the correlation detection unit comprises: a number determination subunit, for determining the number of text illustration composite graphs comprised in the composite graph blocks; a distance analyzing subunit, for in the case of merely one text illustration composite graph included in the composite graph blocks, selecting a legend primitive having a distance to the text illustration composite graph less than a predetermined space as a legend primitive correlated to the text illustration composite graph; a bigraph analyzing subunit, for in the case of multiple text illustration composite graphs comprised in the composite graph blocks, taking the multiple composite graphs and all legend primitives obtained through parsing as vertices of a bigraph to determine correlations between the multiple composite graphs and the legend primitives based on the bigraph.

In this technical solution, correlation identification is realized for text illustration composite graphs and legend primitives according to a close distance principle and a bisection best matching method, which is helpful in deriving logic relationships more appropriately and more accurately, based on which the flow rearrangement of a fixed layout document may be realized.

In the above technical solution, preferably, the legend primitive extraction unit comprises: information reading subunit, for reading preset layout feature information of the legend primitives; a primitive retrieving subunit, for according to the read layout feature information, retrieving the legend primitives from text primitives obtained by the document parsing unit.

In this technical solution, legend primitives are featured with some layout properties, such as fonts, beginning with a keyword, such as "Figure", centralized, a limit on the number of words, a location relationship with respect to other text. Based on such property information, primitives of corresponding contents may be found out, without having words in the main body of text, such as "FIG. 1" identified as legend primitives (specifically, titles of figures or explanatory words), so as to achieve accurate retrieving of legend primitives.

According to another aspect of this invention, a logic process method for composite graphs in a fixed layout document is provided, comprising: a step 202 for extracting composite graph blocks from the fixed layout document; a step 204 for extracting legend primitives from the text primitives that are obtained through parsing the fixed layout document; a step 206 for detecting correlations between the composite graph blocks and the legend primitives; and a step 208 for storing the detected correlations.

In this technical solution, a composite graph block comprises a graph and text within or around the graph. Composite graph block extraction is a process of separating the graph and its corresponding text, as a whole, from the main body of a fixed layout document, to enable proper typesetting of composite graphs in the flow arrangement of the fixed layout document. For the reason of document typesetting, a graph may be separated from its legend (for example, under the graph, including the title of the graph and a piece of text describing the graph) by a larger space. For the purpose of precise composite graph block extraction, graphs are liable to be separated from their legends, wherein graphs are partitioned into composite graph blocks while their legends are remained in other segments of the fixed layout document. Although partition is realized in the physical structure, some issues may arise in the logical structure. Thus, through establishing correlations between composite graph blocks and their legend primitives in this solution, composite graph blocks may be correlated with their legend primitives in the logic structure, enabling a more accurate and reasonable partition process of composite graphs in a fixed layout document.

The above technical solution, preferably before step 206, further comprises: acquiring feature property information of the composite graph blocks to classify elements contained in the composite graph blocks according to the feature property information; and according to the classification result, preserving text illustration composite graphs of the composite graph blocks and filtering other elements for the detection of correlations between the text illustration composite graphs and the legend primitives at step 206.

In this technical solution, the composite graph blocks comprise text illustration composite graphs and other elements, such as graphic trademarks, formulas, column bars, page heads, page footers, decorated composite graphs. These elements may have impacts on scopes corresponding to actual text illustration composite graphs when composite graphs are delimited. For instance, a scope corresponding to a text illustration composite graph is delimited by its minimal enclosing rectangle. Without the filtering process of other elements, a rectangle box larger than its actual scope may be determined, as a result, contents that are not legend primitives may be considered as legend primitives by mistake, causing logic mistakes accordingly.

The above technical solution, preferably, further comprises: adding a corresponding logic label for each element of the composite graph blocks to specify its category; and the step 208 further comprises: storing the logic labels and/or identifiers of primitives corresponding to the logic labels.

In this technical solution, through adding a logic label for each element, logic relationships corresponding to various elements may be examined and managed readily, so that better display effects may be achieved after the flow conversion of a fixed layout document.

In the above technical solution, preferably, the step 206 comprises: in the case of merely one text illustration composite graph included in the composite graph blocks, selecting a legend primitive having a distance to the text illustration composite graph less than a predetermined space as a legend primitive correlated to the text illustration composite graph; and in the case of multiple text illustration composite graphs comprised in the composite graph blocks, taking the multiple composite graphs and all legend primitives obtained through parsing as vertices of a bigraph to determine correlations between the multiple composite graphs and the legend primitives based on the bigraph.

In this technical solution, correlation identification is realized for text illustration composite graphs and legend primitives according to a close distance principle and a bisection best matching method, which is helpful in deriving logic relationships more appropriately and more accurately, based on which the flow rearrangement of a fixed layout document may be realized.

In the above technical solution, preferably, the step 204 comprises: reading preset layout feature information of the legend primitives; and according to the read layout feature information, retrieving the legend primitives from text primitives obtained through parsing.

In this technical solution, legend primitives are featured with some layout properties, such as fonts, beginning with a keyword, such as "Figure", centralized, a limit on the number of words, a location relationship with respect to other text. Based on such property information, primitives of corresponding contents may be found out, without having words in the main body of text, such as "FIG. 1" identified as legend primitives (specifically, titles of figures or explanatory words), so as to achieve accurate retrieving of legend primitives.

With the above technical solution, a logic process on composite graphs partitioned from a fixed layout document may be performed appropriately to facilitate layout understanding of composite graphs on graph-text mixing pages of the fixed layout document, and avoid logic mistakes.

DESCRIPTION OF THE EMBODIMENTS

For a more distinct understanding of the above objects, features and advantageous of this invention, it will be described in a further detail with reference to drawings and particular embodiments below. It should be noticed that, in the case of no conflicts, embodiments and features of embodiments of this invention may be combined with each other.

Many details will be set forth in the following description to achieve a throughout understanding of this invention, however, this invention may be implemented in other ways different from that disclosed herein, and therefore is not limited to the particular embodiments disclosed below.

It should be noted that the relative arrangement of the components and steps, the numerical expressions, and numerical values set forth in these embodiments do not limit the scope of the present invention unless it is specifically stated otherwise.

Meanwhile, it should be appreciated that, for the convenience of description, various parts shown in those drawings are not necessarily drawn on scale.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

Figure 1:
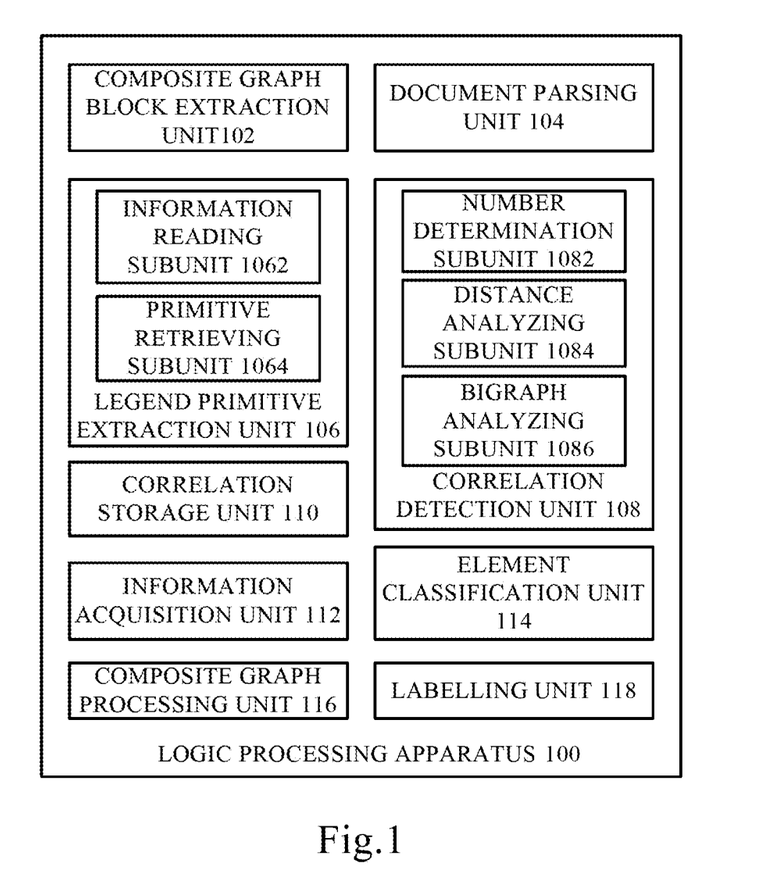
FIG. 1 shows a block diagram of a logic process apparatus for composite graphs in a fixed layout document according to an embodiment of this invention.

FIG. 1 shows a block diagram of a logic process apparatus for composite graphs in a fixed layout document according to an embodiment of this invention.

As shown in FIG. 1, a logic process apparatus 100 for composite graphs in a fixed layout document according to an embodiment of this invention comprises: a composite graph block extraction unit 102, for extracting composite graph blocks from the fixed layout document; a document parsing unit 104, for parsing the fixed layout document to obtain text primitives contained therein; a legend primitive extraction unit 106, for extracting legend primitives from the text primitives; a correlation detection unit 108, for detecting correlations between the composite graph blocks and the legend primitives; and a correlation storage unit 110, for storing the detected correlations.

In this technical solution, a composite graph block comprises a graph and text within or around the graph. Composite graph block extraction is a process for separating the graph and its corresponding text as a whole from the main body of a fixed layout document, to enable proper typesetting of composite graphs in the flow rearrangement of the fixed layout document. For the reason of document typesetting, a graph may be separated from its legend (for example, under the graph, including the title of the graph and a piece of text describing the graph) by a larger space. For the purpose of precise composite graph block extraction, graphs are liable to be separated from their legends, wherein graphs are partitioned into composite graph blocks while their legends are remained in other segments of the fixed layout document. Although partition is realized in the physical structure, some issues may arise in the logical structure. Thus, through establishing correlations between composite graph blocks and their legend primitives in this solution, composite graph blocks may be correlated with their legend primitives in the logic structure, enabling a more accurate and reasonable partition process of composite graphs in a fixed layout document.

The above technical solution, preferably further comprises: an information acquisition unit 112, for acquiring feature property information of the composite graph blocks; an element classification unit 114, for according to the feature property information, classifying elements contained in the composite graph blocks; a composite graph processing unit 116, for according to the classification result, preserving text illustration composite graphs of the composite graph blocks and filtering other elements for the detection of correlations between the text illustration composite graphs and the legend primitives performed by the correlation detection unit 108.

In this technical solution, the composite graph blocks comprise text illustration composite graphs and other elements, such as graphic trademarks, formulas, column bars, page heads, page footers, decorated composite graphs. These elements may have impacts on scopes corresponding to actual text illustration composite graphs when composite graphs are delimited. For instance, a scope corresponding to a text illustration composite graph is delimited by its minimal enclosing rectangle. Without the filtering process of other elements, a rectangle box larger than its actual scope may be determined, as a result, contents that are not legend primitives may be considered as legend primitives by mistake, causing logic mistakes accordingly.

The above technical solution, preferably, further comprises: a labelling unit 118, for adding a corresponding logic label for each element of the composite graph blocks to specify its category; and the correlation storage unit 110 is further used to store the logic labels and/or identifiers of primitives corresponding to the logic labels.

In this technical solution, through adding a logic label for each element, logic relationships corresponding to various elements may be examined and managed readily, so that better display effects may be achieved after the flow of a fixed layout document.

In the above technical solution, preferably, the correlation detection unit 108 comprises: a number determination subunit 1082, for determining the number of text illustration composite graphs comprised in the composite graph blocks; a distance analyzing subunit 1084, for in the case of merely one text illustration composite graph included in the composite graph blocks, selecting a legend primitive having a distance to the text illustration composite graph less than a predetermined space as a legend primitive correlated to the text illustration composite graph; a bigraph analyzing subunit 1086, for in the case of multiple text illustration composite graphs comprised in the composite graph blocks, taking the multiple composite graphs and all legend primitives obtained through parsing as vertices of a bigraph to determine correlations between the multiple composite graphs and the legend primitives based on the bigraph.

In this technical solution, correlation identification is realized for text illustration composite graphs and legend primitives according to a close distance principle and a bisection best matching method, which is helpful in deriving logic relationships more appropriately and more accurately, based on which flow rearrangement of a fixed layout document may be realized.

In the above technical solution, preferably, the legend primitive extraction unit 106 comprises: information reading subunit 1062, for reading preset layout feature information of the legend primitives; a primitive retrieving subunit 1064, for according to the layout feature information, retrieving the legend primitives from text primitives obtained by the document parsing unit 104 through parsing.

In this technical solution, legend primitives are featured with some layout properties, such as fonts, beginning with a keyword, such as "Figure", centralized, a limit on the number of words, a location relationship with respect to other text. Based on such property information, primitives of corresponding contents may be found out, without having words in the main body of text, such as "FIG. 1", identified as legend primitives (specifically, titles of figures or explanatory words), so as to achieve accurate retrieving of legend primitives.

Figure 2:
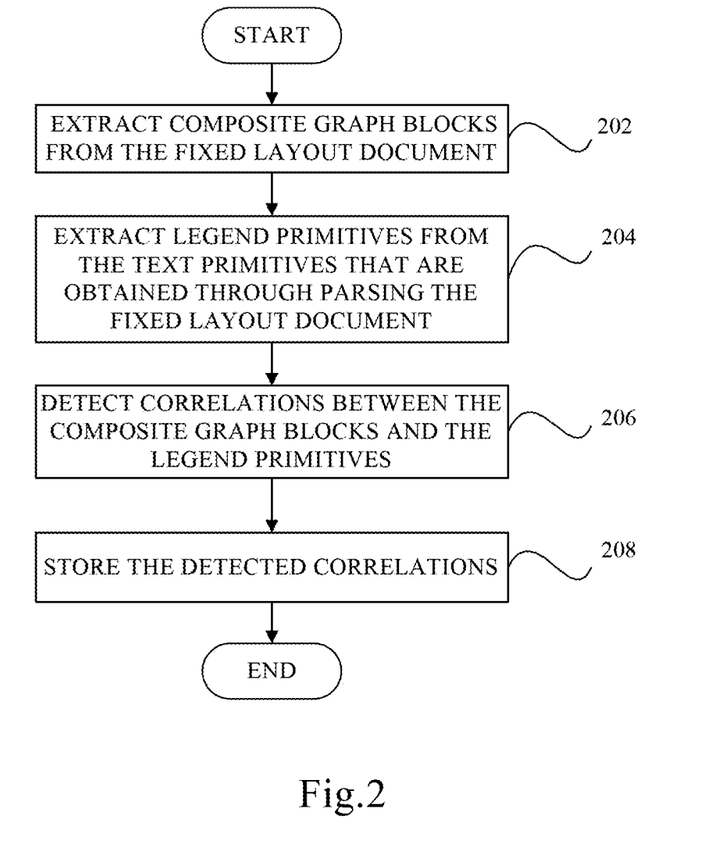
FIG. 2 shows a flowchart of a logic process method for composite graphs in a fixed layout document according to an embodiment of this invention.

FIG. 2 shows a flowchart of a logic process method for composite graphs in a fixed layout document according to an embodiment of this invention.

As shown in FIG. 2, a logic process method for composite graphs in a fixed layout document according to an embodiment of this invention comprises: a step 202 for extracting composite graph blocks from the fixed layout document; a step 204 for extracting legend primitives from the text primitives that are obtained through parsing the fixed layout document; a step 206 for detecting correlations between the composite graph blocks and the legend primitives; and a step 208 for storing the detected correlations.

In this technical solution, a composite graph block comprises a graph and text within or around the graph. Composite graph block extraction is a process of separating the graph and its corresponding text, as a whole, from the main body of a fixed layout document, to enable proper typesetting of composite graphs in the flow rearrangement of the fixed layout document. For the reason of document typesetting, a graph may be separated from its legend (for example, under the graph, including the title of the graph and a piece of text describing the graph) by a larger space. For the purpose of precise composite graph block extraction, graphs are liable to be separated from their legends, wherein graphs are partitioned into composite graph blocks while their legends are remained in other segments of the fixed layout document. Although partition is realized in the physical structure, some issues may arise in the logical structure. Thus, through establishing correlations between composite graph blocks and their legend primitives in this solution, composite graph blocks may be correlated with their legend primitives in the logic structure, enabling a more accurate and reasonable partition process of composite graphs in a fixed layout document.

The above technical solution, preferably before step 206, further comprises: acquiring feature property information of the composite graph blocks to classify elements contained in the composite graph blocks according to the feature property information; according to the classification result, preserving text illustration composite graphs of the composite graph blocks and filtering other elements for the detection of correlations between the text illustration composite graphs and the legend primitives at step 206.

In this technical solution, the composite graph blocks comprise text illustration composite graphs and other elements, such as graphic trademarks, formulas, column bars, page heads, page footers, decorated composite graphs. These elements may have impacts on scopes corresponding to actual text illustration composite graphs when composite graphs are delimited. For instance, a scope corresponding to a text illustration composite graph is delimited by its minimal enclosing rectangle. Without the filtering process of other elements, a rectangle box larger than its actual scope may be determined, as a result, contents that are not legend primitives may be considered as legend primitives by mistake, causing logic mistakes accordingly.

The above technical solution, preferably, further comprises: adding a corresponding logic label for each element of the composite graph blocks to specify its category; and the step 208 further comprises: storing the logic labels and/or identifiers of primitives corresponding to the logic labels.

In this technical solution, through adding a logic label for each element, logic relationships corresponding to various elements may be examined and managed readily, so that better display effects may be achieved after the flow of a fixed layout document.

In the above technical solution, preferably, the step 206 comprises: in the case of merely one text illustration composite graph included in the composite graph blocks, selecting a legend primitive having a distance to the text illustration composite graph less than a predetermined space as a legend primitive correlated to the text illustration composite graph; and in the case of multiple text illustration composite graphs comprised in the composite graph blocks, taking the multiple composite graphs and all legend primitives obtained through parsing as vertices of a bigraph to determine correlations between the multiple composite graphs and the legend primitives based on the bigraph.

In this technical solution, correlation identification is realized for text illustration composite graphs and legend primitives according to a close distance principle and a bisection best matching method, which is helpful in deriving logic relationships more appropriately and more accurately, based on which flow rearrangement of a fixed layout document may be realized.

In the above technical solution, preferably, the step 204 comprises: reading preset layout feature information of the legend primitives; according to the read layout feature information, retrieving the legend primitives from text primitives obtained through parsing.

In this technical solution, legend primitives are featured with some layout properties, such as fonts, beginning with a keyword, such as "Figure", centralized, a limit on the number of words, a location relationship with respect to other text. Based on such property information, primitives of corresponding contents may be found out, without having words in the main body of text, such as "FIG. 1" identified as legend primitives (specifically, titles of figures or explanatory words), so as to achieve accurate retrieving of LLGGs.

Figure 3:
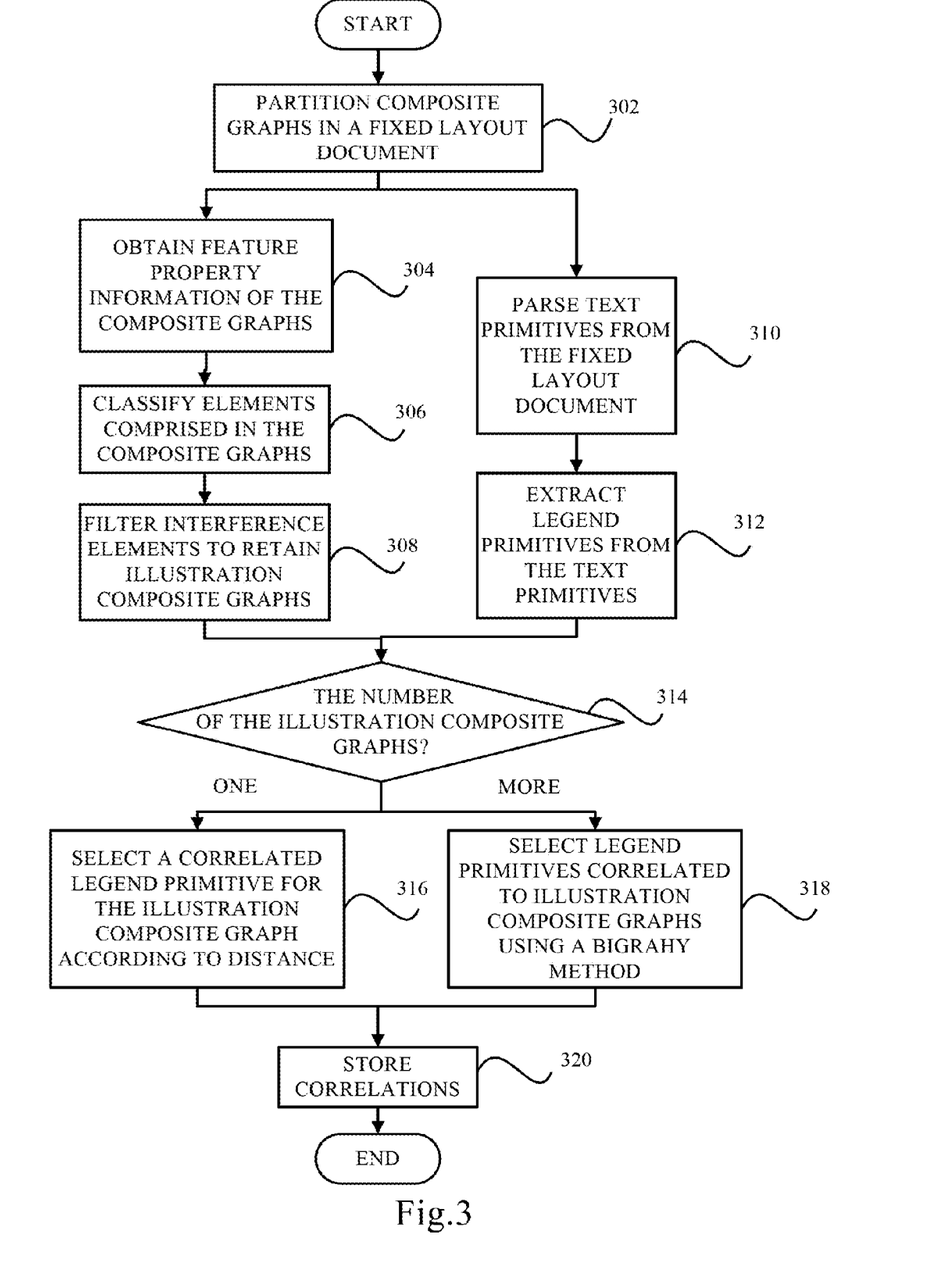
FIG. 3 shows a particular flowchart of the logic process performed on composite graphs in a fixed layout document according to an embodiment of this invention.

FIG. 3 shows a particular flowchart of the logic process performed on composite graphs in a fixed layout document according to an embodiment of this invention.

As shown in FIG. 3, the logic process performed on composite graphs in a fixed layout document according to an embodiment of this invention comprises the following steps.

At step 302, composite graphs are partitioned from a fixed layout document. Particularly, the partitioned composite graphs may comprise text illustration composite graphs and other elements, such as dedicated composite graphs, column bars, etc.

After partition, all primitives' IDs of the partitioned composite graph may be stored, such as in a XML file, for searching composite graphs according to stored primitive IDs when invoking or processing those composite graphs.

In practice, the above composite graph partition process merely partitions composite graph blocks from the fixed layout document based on its physical structure, without an analysis on its logical structure. Thereby, in normal fixed layout document partition, generally, correlations are identified according to physical features, such as distances between images and text, resulting in partitioned composite graphs without corresponding legends.

In following steps, the finished composite graphs are accurately correlated to their legends "left" in the fixed layout document to realize a logic process on the composite graphs.

Step 304 to step 308 are a process performed on the composite graphs.

At step 304, feature property information of the composite graphs is obtained. Particularly, features of the composite graphs, such as page layouts, style information, and content image textures are extracted. Some particular main features as shown in table 1.

TABLE 1

| 1 | Height | composite graph Height |
|---|---|---|
| 2 | Length | composite graph length |
| 3 | Area | composite graph area |
| 4 | Eccentricity | composite graph eccentricity |
| 5 | BlkPix | Percent of composite graph with black pixels |

TABLE 1-continued

| 6 | Std | standard deviation of pixel gray values of composite graph |
|---|---|---|
| 7 | Entropy | Image information measured by image entropy |
| 8 | contract | Image texture sharpness reflected by inertia moment |
| 9 | Correlation | Texture correlation in a direction |
| 10 | Energy | Gray distribution uniformity measured by angular second moment |
| 11 | Homogeneity | Image partial uniformity reflected by inverse Difference Moment |

Meanwhile, according to features of actual composite graphs, distances and directions are selected to calculate gray-level co-occurrence matrices and feature coefficients. Texture feature vectors are constructed by the feature coefficients and are used as the input of a statistic classifier.

At step 306, elements comprised in the composite graphs are classified. Particularly, using SVM (Support Vector Machine) as a classifier and selecting a RBF (Radial Basis Function), various elements comprised in the partitioned composite graphs, such as text illustration composite graphs, graphic trademarks, formulas, column bars, page heads, page footers, decorated composite graphs, are classified, and each element is labelled according to the classification result to obtain its logic tag in the layout.

At step 308, interference elements are filtered to retain text illustration composite graphs. Particularly, graphic trademarks, formulas, column bars, page heads, page footers, decorated composite graph objects are filtered, which may otherwise impact correlations between text illustration composite graphs and legends due to their prevalent existence.

Text primitives are processed at steps 310 and 312.

At step 310, the fixed layout document is parsed to obtain text primitives through parsing.

At step 312, legend primitives are extracted from the text primitives. In particular, legend primitives may be distinguished from body text according to text feature properties of legend primitives. Taking figure titles as an example, their font may be smaller than the body text font, with a starting keyword, such as "Figure/Fig", "Figure/Fig 1", "Figure/Fig 1-1", which may be represented in a regular expression.

Meanwhile, figure titles extracted may be references of these figures in the main body of text. References of figure titles in the main body of text may be excluded according to typesetting features of legend primitives, such as, centralized, a limit on the number of words in a piece of text, etc.

At step 314, the number of text illustration composite graphs among the current composite graph blocks is determined. If there is only one text illustration composite graph, the process proceeds to step 316; otherwise it proceeds to step 318.

At step 316, a correlated legend primitive is selected for a text illustration composite graph according to distance. Particularly, taking figure titles as an example, when there is only one text illustration composite graph and one (or more) figure title in a page, i.e., in a one-to-one mode, a figure title closest to the text illustration composite graph is selected as its title according to a closest distance principle.

At step 318, legend primitives correlated to text illustration composite graphs are selected using a bigraph method. Particularly, when there are multiple text illustration composite graphs and multiple figure titles on a page, it is not sufficient to select according to distances and styles. Composite graphs and all legend primitives are taken as vertices of a bigraph, and weights are defined for correlations between vertices according to distances between figure titles and text illustration composite graphs, and then through maximum weight matching of the bigraph, most possible correlations between text illustration composite graphs and figure titles are searched to get globally optimal correlation matching.

At step 320, the correlations between text illustration composite graphs and figure titles are stored. Further, logic tags of various elements of the composite graphs obtained in the classification result at step 306 may be stored, as well as a set of primitive IDs corresponding to each logic category, particularly, in the XML format.

Below, several embodiments will be given to describe technical solutions of this invention in detail respectively.

Figure 4A:
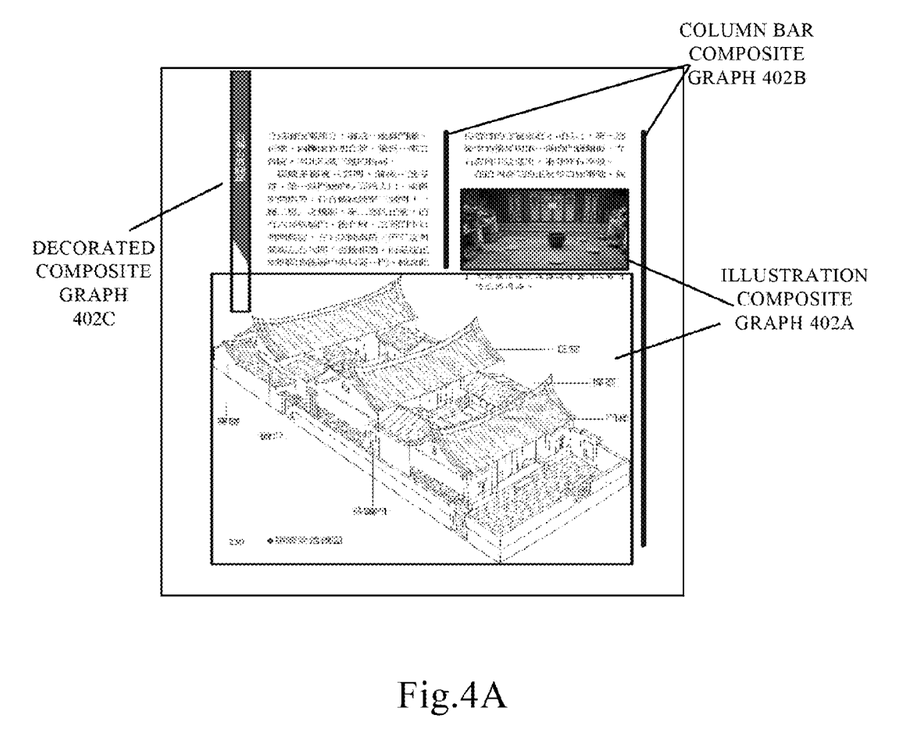
FIG. 4A and FIG. 4B are schematic diagrams of the logic process performed on composite graphs in a fixed layout document according to an embodiment of this invention.
Figure 4B:
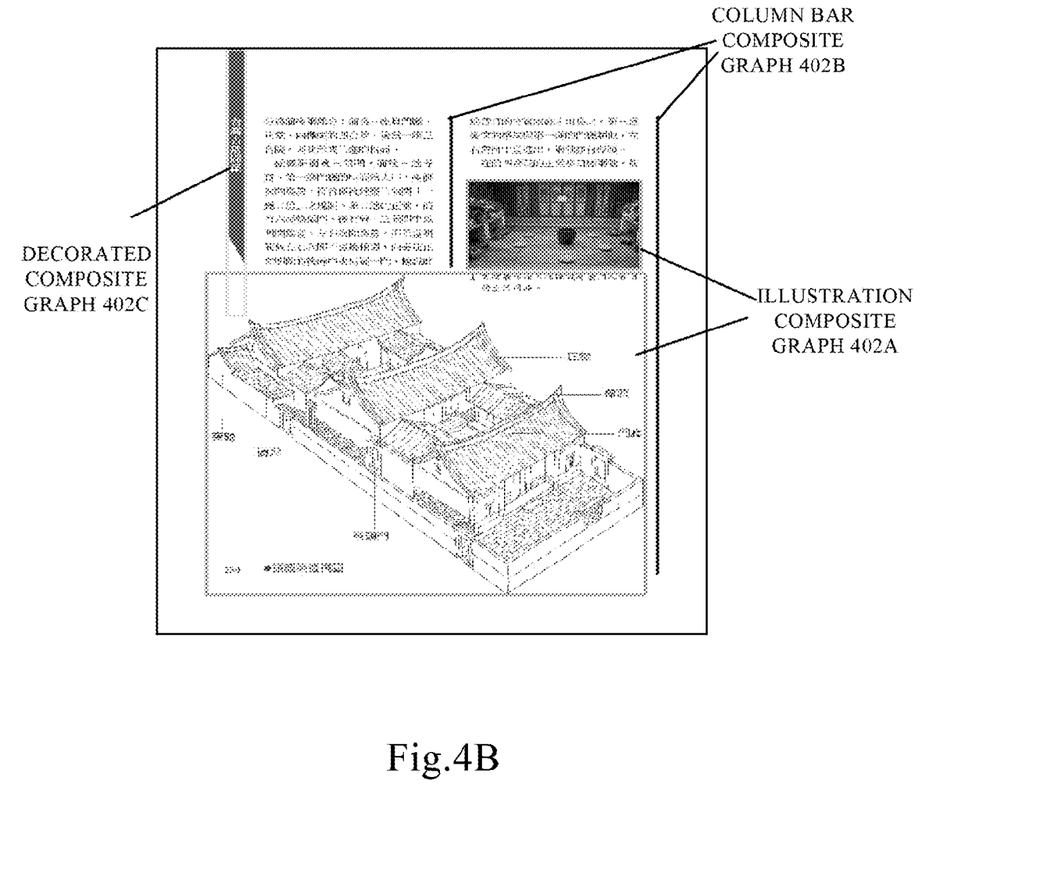

FIG. 4A and FIG. 4B show schematic diagrams of a logic process performed on composite graphs in a fixed layout document according to an embodiment of this invention.

As shown in the figures, taking a two-column page of a Chinese fixed layout document "台灣古厝圖鑑" as an example, through partitioning that page, composite graph blocks including a text illustration composite graph 402A, a column bar composite graph 402B and a decorated composite graph 402C are extracted. Primitive IDs of all composite graph blocks may be stored in a XML file for the processing of these composite graph blocks. Below, a logic process will be performed on the composite graph objects on the page according to a flowchart shown in FIG. 3.

First of all, after a parsing engine obtains various primitives of the fixed layout document, a layout analysis is performed on the document. Composite graph blocks partitioned as the result of the layout analysis are read out from a XML file, including their minimal enclosing rectangles, and a set of primitive IDs constituting each composite graph. Particularly, FIG. 4A shows the effect of having minimal enclosing rectangles plotted on the page.

Then, feature property information of all composite graphs on the page is extracted, such as layouts, style information, textures of content images. Particularly, main feature property information is shown in Table 1. The feature property information is input into a trained statistic classifier SVM to classify the five composite graphs of the page, which are then labelled with logic tags according to the classification result. Particularly, as shown in the classification result of FIG. 4B, the page comprises three types of composite graph logic tags, two text illustration composite graphs 402A in the main body of text, two column bar composite graphs 402B, and a decorated composite graph 402C on the left page edge. The text illustration composite graph 402B on the lower portion of the main body page and the decorated composite graph on the left of the page comprise text primitives and a large amount of path operations, having not only difficulty in partition, but also lower recognition accuracy. However, with this invention, all composite graphs on the page are labelled with logic category tags accurately, and the logic labelling result may be directly used in the flow rearrangement of the fixed layout document.

In the above embodiment, a process of labelling composite graphs that are partitioned from a fixed layout document with logic tags has been described. Below, a scheme of correlating composite graphs and legends will be described with another embodiment.

Figure 5A:
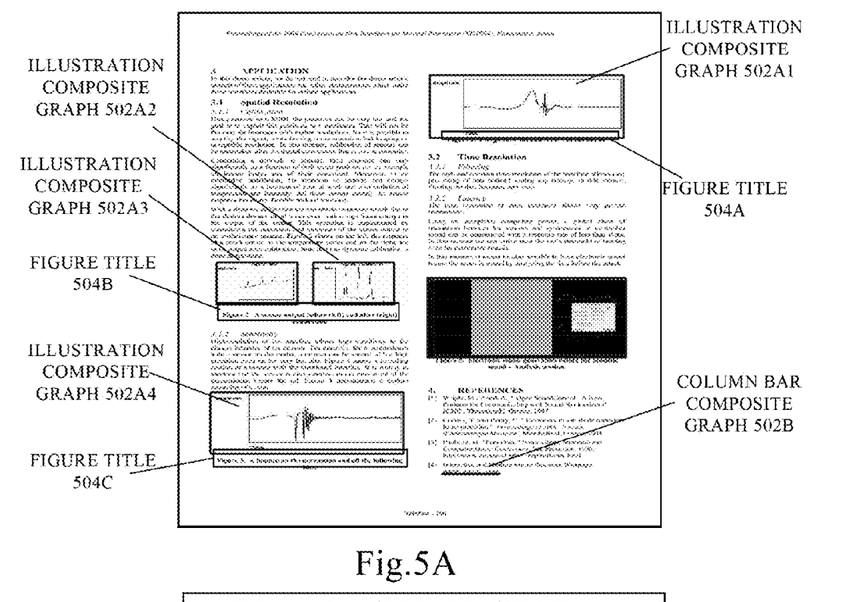
FIG. 5A and FIG. 5B are schematic diagrams of the logic process performed on composite graphs in a fixed layout document according to another embodiment of this invention.
Figure 5B:
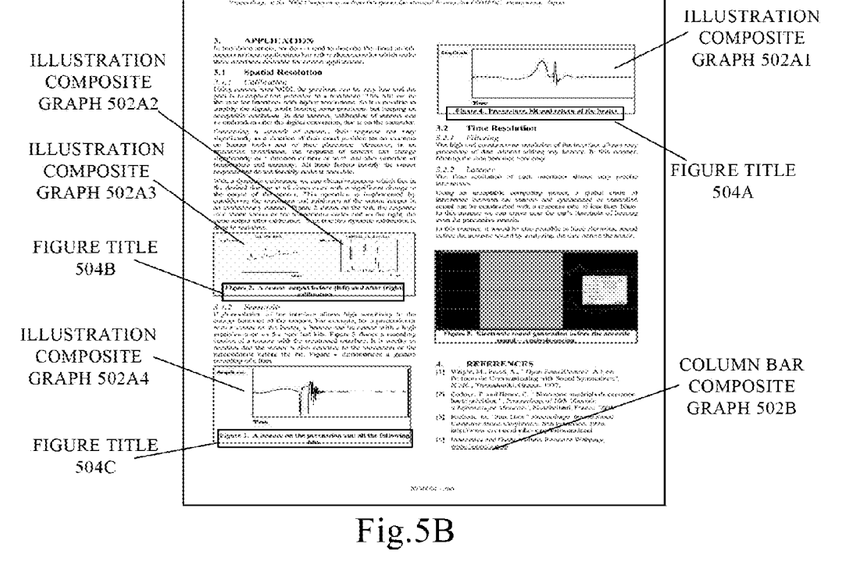

FIG. 5A and FIG. 5B show schematic diagrams of a logic process performed on composite graphs in a fixed layout document according to another embodiment of this invention.

As shown in the figures, taking a two-column page of an English fixed layout document "TOASTER and KROONDE: High-Resolution and High-Speed Real-time Sensor Interfaces" as an example, after a partition process of this page, composite graph blocks including a text illustration composite graph 502A1, a text illustration composite graph 502A2, a text illustration composite graph 502A3, a text illustration composite graph 502A4, and a column bar composite graph 502B are extracted. All primitives' IDs of those composite graph blocks are stored in a XML file for the processing of those composite graph blocks. Below, a logic process will be performed on those composite graph objects of the page according to the flowchart shown in FIG. 3.

First of all, after a parsing engine obtains various primitives of the fixed layout document, a layout analysis is performed on the document. Composite graph blocks partitioned as the result of the layout analysis are read out from a XML file, including their minimal enclosing rectangles, and a set of primitive IDs constituting each composite graph. Particularly, FIG. 5A shows the effect of having minimal enclosing rectangles plotted on the page.

Then, those composite graph blocks are processed. Particularly, all elements included in the composite graph blocks are analyzed in terms of their categories. According to the analysis result, text illustration composite graphs are preserved while filtering graphic trademarks, formulas, column bars, page heads, page footers, decorated composite graph objects from the page, which may otherwise impact the identification of correlations between text illustration composite graphs and legends due to their existence.

Meanwhile, legend information is also obtained. Herein, figure titles are taken as an example. From text elements obtained after parsing the fixed layout document, according to text feature properties (such as, beginning with a keyword "Figure" in the page) and typesetting feature properties (such as centralized) of figure titles, information about figure titles is extracted, with references of those figure titles to be selected in the main body of text filtered. Particularly, a figure title 504A, a figure title 504B, and a figure title 504C as shown are obtained through analysis.

Finally, the text illustration composite graphs are correlated with the figure titles. Particularly, because there are multiple text illustration composite graphs on the page, the bigraph method is adopted. Composite graphs and all legend primitives are taken as vertices of a bigraph, and correlation weights between vertices are defined according to distances between figure titles and text illustration composite graphs. Through maximum weight matching of the bigraph, most possible correlations between text illustration composite graphs and figure titles are searched. The inputs of the page comprise six composite graphs, as shown in FIG. 5B, the column bar composite graph on the lower right portion of the page is filtered, and after combining two text illustration composite graphs in the middle portion of the left column, four text illustration composite graphs are correlated with four figure titles. This result may be directly used in the flow rearrangement of the fixed layout document.

Technical solutions of this invention have been described above with reference to drawings. Through parsing and analyzing meta information embedded in the fixed layout document (such as, a PDF document), and after partitioning composite graphs contained in a page, for all composite graphs of the page, their page layouts, style information and textures of content images are extracted and used as inputs of a SVM classifier to perform a logic labelling process on the composite graphs according to their classified categories.

Meanwhile, from text primitive elements of the fixed layout document obtained through parsing, figure titles to be selected are extracted, and correlations between text illustration composite graphs and their figure titles are identified according to a closest distance principle and bisection best matching. So, it is ensured that after converting images of a fixed layout document into a flow layout document, legends may be synchronized with, i.e., connected to corresponding images, so that the fixed layout document may be flow rearranged into a flow layout document according to reading order.

One skilled in the art should understand that, the embodiments of this application may be provided as a method, a system, or a computer program product. Therefore, this application may be in the form of full hardware embodiments, full software embodiments, or a combination thereof. Moreover, this application may be in the form of a computer program product that is implemented on one or more computer-usable storage media (including, without limitation, magnetic disk storage, CD-ROM and optical storage) containing computer-usable program codes.

This application is described referring to the flow chart and/or block diagram of the method, device (system) and computer program product according to the embodiments of this application. It should be understood that, each flow and/or block in the flow chart and/or block diagram and the combination of flow and/or block in the flow chart and/or block diagram may be realized via computer program instructions. Such computer program instructions may be provided to the processor of a general-purpose computer, special-purpose computer, a built-in processor or other programmable data processing devices, to produce a machine, so that the instructions executed by the processor of a computer or other programmable data processing devices may produce a device for realizing the functions specified in one or more flows in the flow chart and/or one or more blocks in the block diagram.

Such computer program instructions may also be stored in a computer-readable storage that can guide a computer or other programmable data processing devices to work in a specific mode, so that the instructions stored in the computer-readable storage may produce a manufacture including a commander equipment, wherein the commander equipment may realize the functions specified in one or more flows of the flow chart and one or more blocks in the block diagram.

Such computer program instructions may also be loaded to a computer or other programmable data processing devices, so that a series of operational processes may be executed on the computer or other programmable devices to produce a computer-realized processing, thereby the instructions executed on the computer or other programmable devices may provide a process for realizing the functions specified in one or more flows in the flow chart and/or one or more blocks in the block diagram.

What are described above are merely preferred embodiments of the present invention, but do not limit the protection scope of the present invention. Various modifications or variations can be made to this invention by persons skilled in the art. Any modifications, substitutions, and improvements within the scope and spirit of this invention should be encompassed in the protection scope of this invention.

What is claimed is:

1. A logic process method for composite graphs in a fixed layout document, characterized in comprising steps of:
    extracting composite graph blocks from the fixed layout document;
    extracting legend primitives from the text primitives that are obtained through parsing the fixed layout document;
    acquiring feature property information of the composite graph blocks to classify elements contained in the composite graph blocks to generate a classification result;
    according to the classification result, preserving text illustration composite graphs of the composite graph blocks and filtering other elements for a detection of correlations between the text illustration composite graphs and the legend primitives;
    detecting correlations between the composite graph blocks and the legend primitives; and
    storing the detected correlations,
    wherein the step of detecting correlations between the composite graph blocks and the legend primitives comprises:
    in the case of merely one text illustration composite graph included in the composite graph blocks, selecting a legend primitive having a distance to the text illustration composite graph less than a predetermined space as the legend primitive correlated to the text illustration composite graph; and
    in the case of multiple text illustration composite graphs comprised in the composite graph blocks, taking the multiple text illustration composite graphs and all legend primitives obtained through parsing as vertices of a bigraph to determine correlations between the multiple text illustration composite graphs and the legend primitives based on the bigraph.

2. The logic process method for composite graphs in a fixed layout document according to claim 1, wherein the method further comprises: the step of adding a corresponding logic label for each element of the composite graph blocks to specify its category; and
    wherein the step of storing the detected correlations further comprises storing the logic labels and/or identifiers of primitives corresponding to the logic labels.

3. The logic process method for composite graphs in a fixed layout document according claim 1, wherein the step of extracting legend primitives from the text primitives that are obtained through parsing the fixed layout document comprises:
    reading preset layout feature information of the legend primitives; and
    according to the read layout feature information, retrieving the legend primitives from text primitives obtained through parsing to obtain the legend primitives.

4. A logic process apparatus for composite graphs in a fixed layout document, characterized in comprising:
    a processor; and
    a memory having instructions thereon, which, when executed by the processor, cause the processor to perform operations of:
    extracting composite graph blocks from the fixed layout document;
    parsing the fixed layout document to obtain text primitives contained therein;
    extracting legend primitives from the text primitives;
    detecting correlations between the composite graph blocks and the legend primitives;
    storing the detected correlations;
    acquiring feature property information of the composite graph blocks;

classifying elements contained in the composite graph blocks according to the feature property information to generate a classification result; and preserving text illustration composite graphs of the composite graph blocks and filtering other elements for a detection of correlations between the text illustration composite graphs and the legend primitives performed by a correlation detection unit according to the classification result, wherein the operation of detecting correlations between the composite graph blocks and the legend primitives comprises:

determining a number of the text illustration composite graphs comprised in the composite graph blocks;

in the case of merely one text illustration composite graph included in the composite graph blocks, selecting a legend primitive having a distance to the text illustration composite graph less than a predetermined space as the legend primitive correlated to the text illustration composite graph; and in the case of multiple text illustration composite graphs comprised in the composite graph blocks, taking the multiple composite graphs and all legend primitives obtained through parsing as vertices of a bigraph to determine correlations between the multiple text illustration composite graphs and the legend primitives based on the bigraph.

5. The logic process apparatus for composite graphs in a fixed layout document according to claim 4, wherein the instructions, when executed by the processor, further cause the processor to perform operations of:

adding a corresponding logic label for each element of the composite graph blocks to specify its category; and wherein storing the detected correlations further comprises storing the logic labels and/or identifiers of primitives corresponding to the logic labels.

6. The logic process apparatus for composite graphs in a fixed layout document according to claim 4, wherein the operation of extracting legend primitives from the text primitives comprises:

reading preset layout feature information of the legend primitives; and retrieving the legend primitives from the text primitives obtained from a document parsing unit according to the read layout feature information.

\* \* \* \* \*